(No Model.) 2 Sheets—Sheet 1.
S. T. LIKENS.
CULTIVATOR.
No. 419,691. Patented Jan. 21, 1890.
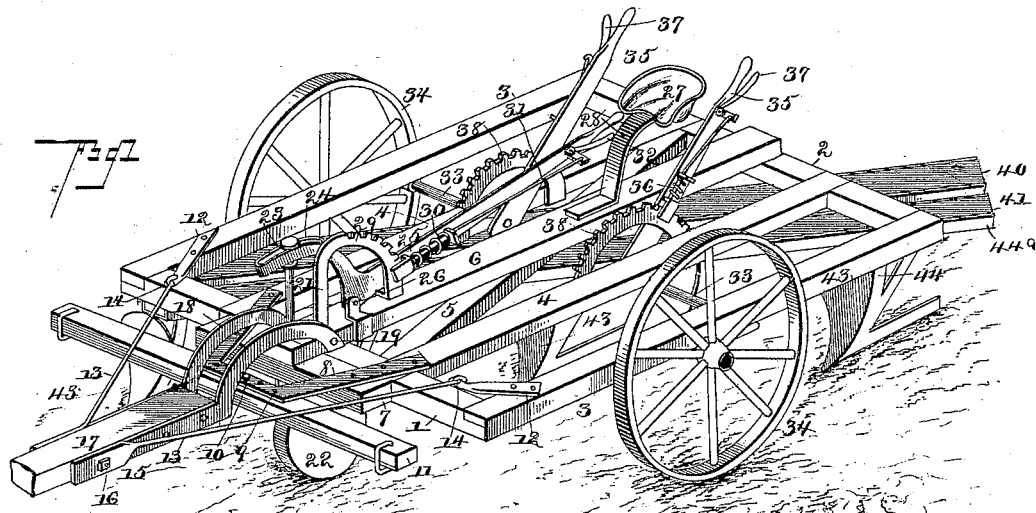
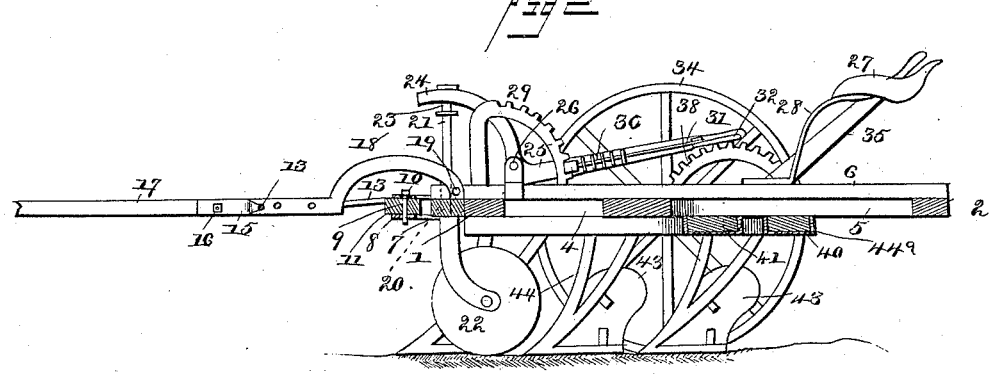
Witnesses:
John Imrie
W. S. Duvall
By his Attorneys,
C. A. Snow & Co.
Inventor
Samuel T. Likens (No Model.) 2 Sheets—Sheet 2.
S. T. LIKENS.
CULTIVATOR.
No. 419,691. Patented Jan. 21, 1890.
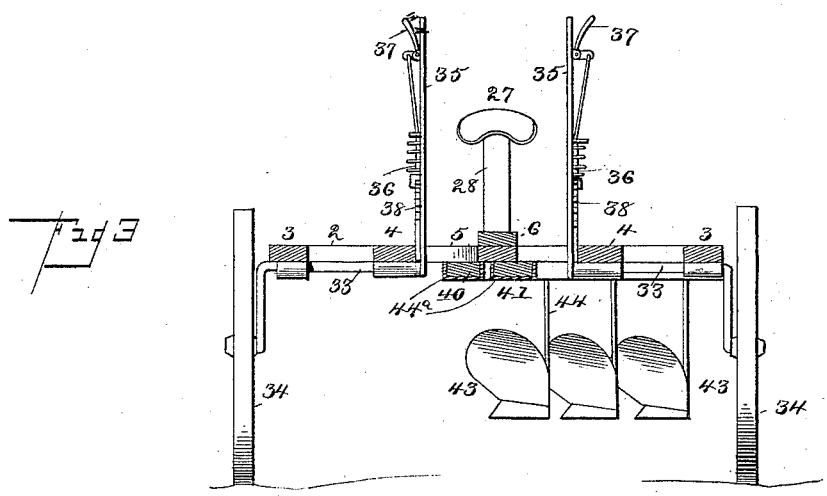
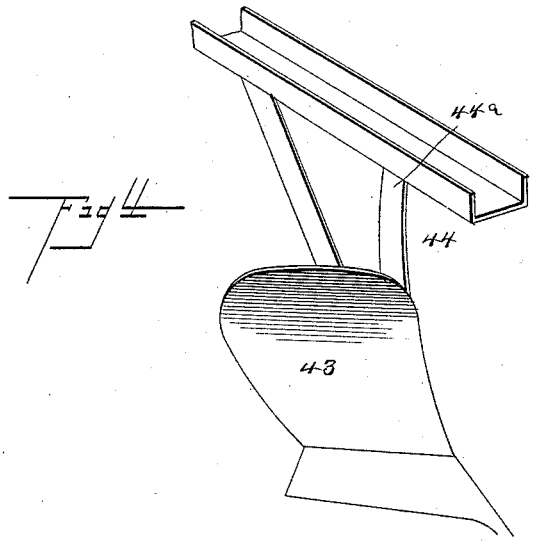
Witnesses:
John Imirie
Inventor:
Samuel T. Likens
By his Attorneys,
C. A. Snow & Co.
N. PETERS. Photo-Lithographer, Washington, D. C.

UNITED STATES PATENT OFFICE.

SAMUEL T. LIKENS, OF AMITY, OREGON.

CULTIVATOR.

SPECIFICATION forming part of Letters Patent No. 419,691, dated January 21, 1890.

Application filed August 19, 1889. Serial No. 321,282. (No model.)

*To all whom it may concern:*

Be it known that I, SAMUEL T. LIKENS, a citizen of the United States, residing at Amity, in the county of Yam Hill and State of Oregon, have invented a new and useful Cultivator, of which the following is a specification.

This invention has relation to cultivators of that class wherein are employed a series of cultivator plows or shovels; and among the objects of the invention are to provide an exceedingly strong rigid frame and means for connecting the plow-standards with the frame and for the disposition to the line of draft and for distributing the strain evenly throughout the frame, and means for raising and lowering the frame, and thereby regulating the inclination of the shovels and their depth of penetration in the soil.

With these general objects in view the invention consists in a frame rectangular in shape formed with opposite end bars and longitudinal bars let into the end bars and rigidly connected therewith; a diagonally-arranged cultivator bar or beam carrying a series of shovels or plows, and in mounting the frame upon suitable crank-axles; in providing levers for operating the axles, whereby either one or both sides of said frame and plows may be elevated or lowered; and, furthermore, in a central caster located adjustably at the front of the frame, and in means for adjusting said casting, and in certain other features of construction hereinafter specified, and particularly pointed out in the claims.

Referring to the drawings, Figure 1 is a perspective of the cultivator constructed in accordance with my invention; Fig. 2, a longitudinal section; Fig. 3, a transverse central section; Fig. 4, a detail of one of the plows or shovels and a portion of the plow-beam.

Like numerals of reference indicate like parts in all the figures of the drawings.

The frame-work comprises a front and rear cross-bar 1 and 2, respectively, which are connected by longitudinal parallel bars 3 and 4, the former numeral designating the outer bars and the latter the two inner bars, said latter bars being diagonally braced by diagonal bar 5. The bars described are, for the purpose of rigidity, let into recesses formed in the end bars and bolted snugly therein. A central superimposed bar 6 extends from the rear bar 2 to the front bar 1 and projects beyond the same, and is connected to a head-block 7, extending from the front bar. Opposite straps 8 project from the forward end of the frame and are bolted thereto, and are provided with a series of openings 9 at their front ends, through which are inserted a pin 10, upon which is swiveled the doubletree 11. At the opposite front corners of the frame are bolted draft-hooks 12, and in the same are loosely connected diagonal brace-bars 13, the rear ends of which terminate in eyes 14 for connection with the hooks, and the forward ends of which terminate in clamping-plates 15, which are clamped by means of bolts 16 to opposite sides of the tongue or draft-bar 17. Curved braces 18 are also connected to the sides of the tongue near its rear end, the rear ends of said braces being pivotally connected, as at 19, to the superimposed central longitudinal bar.

A vertical opening 20 is formed through the head-block and the front end of the superimposed central bar, and in the same is mounted a spindle 21 of the caster-wheel 22. A bearing 23 is formed at the upper end of the spindle, which is embraced by the slotted arm 24 of a bell-crank hand-lever 25, journaled in bearings 26, secured to the central beam, said hand-lever extending within reach of the driver's seat 27, which is mounted upon a spring-bar 28. A segmental rack 29 is mounted upon the central beam at the side of the bell-crank lever, and interlocking with the same is a spring-pressed locking-bolt 30, connected by a link 31 to a handle 32. By this arrangement it is apparent that the front end of the frame may be raised and the rear end consequently lowered, and thus the point of the cultivators raised or lowered accordingly.

Journaled in the two parallel side bars of the frame are axles 33, the outer ends of which are cranked and carry the ground-wheels 34. Hand-levers 35 are connected to the inner ends of each axle, and are provided with a spring-bolt 36 and operating-handles 37 for operating the bolts, which bolts are adapted to interlock with toothed sectors 38, secured to each of the inner faces of the side bars. It is apparent by this that either one or both of the cranked axles may be operated so as to raise or lower one or both sides of the frame, either in the same relative degree or to a different degree, as the necessity of the case may require.

40 and 41 represent the plow-beams, which are mounted in any suitable manner upon the under surface of the frame and extend from the right-hand front corner of said frame to the rear left-hand corner, and are consequently diagonal to the line of draft, and are arranged parallel to each other. If desired, the cultivator shovels or plows 43 may be bolted directly or in any other manner to the beams 41; but I prefer to provide each beam with a U-shaped embracing-jacket 44ª of metal and bolt the plow-standards 44 thereto. Any construction of plow-standard may be employed, and but one plow-beam may be employed, if desired. In this instance, however, I employ a bifurcated standard, so that one branch of the bifurcation may act as a brace to the opposite branch, the front branches of the standards being bolted to the plow-beam 40 and the rear branches to the companion beam 41, said plows being arranged in rear of each other and their shares or shovels being in the line of draft.

Having thus described my invention, what I claim is—

1. In a cultivator of the class described, a frame-work having front and rear bars suitably connected and a superimposed central longitudinal bar, in combination with hook-straps bolted to the opposite front corners of the frame, converging diagonal braces terminating in eyes and connected with the hooks, a draft-pole embraced by the opposite ends of the straps and provided with rearwardly-curved opposite straps or braces pivoted to the superimposed beam, substantially as specified.

2. In a cultivator of the class described, a frame provided with a central perforation at its front end, a caster having a shank mounted in the perforation and adapted to be reciprocated therein and terminating at its upper end in a bearing, a bell-crank lever pivoted to the frame and slotted at one end for a movable connection with a caster-shank and provided with a spring-bolt, and a toothed sector adapted to receive the bolt and lock the caster in any elevation, substantially as specified.

In testimony that I claim the foregoing as my own I have hereto affixed my signature in presence of two witnesses.

SAMUEL T. LIKENS.

Witnesses:
J. W. BRIEDWELL, Jr.,
J. A. LIKENS.